Feb. 21, 1950 — H. B. GILPATRICK — 2,498,412
LOCK RING SAFETY BAR FOR TIRES
Filed June 29, 1948
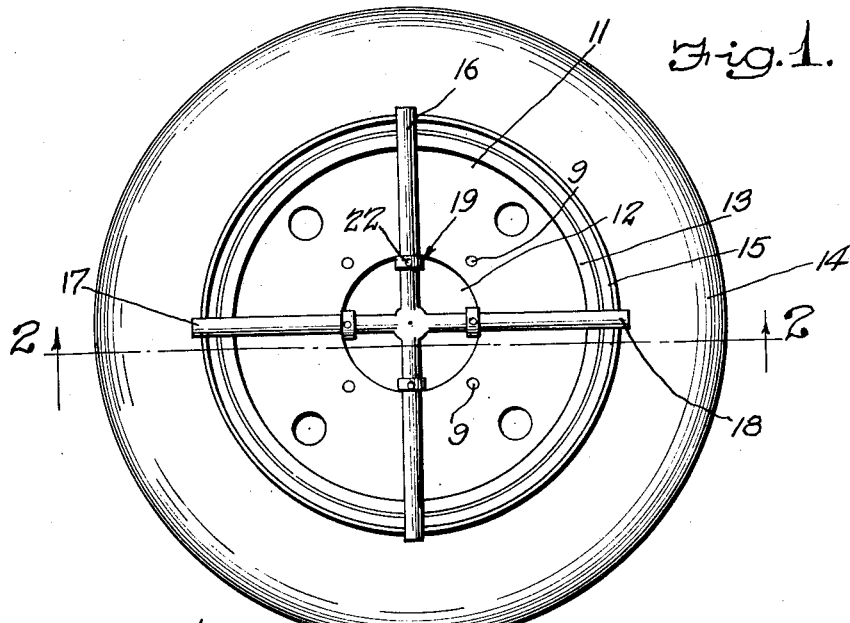
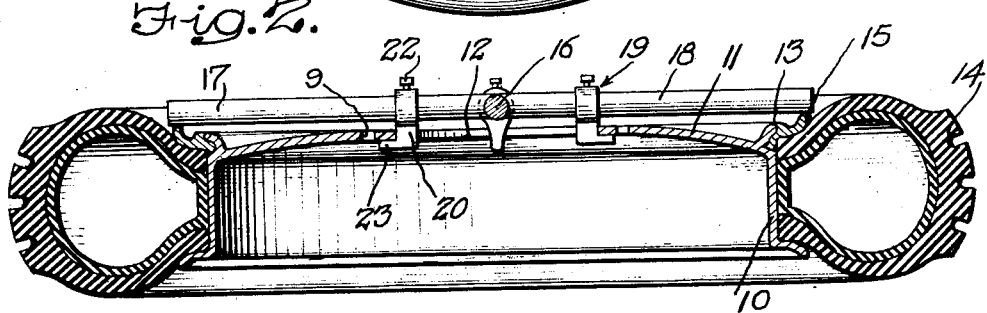
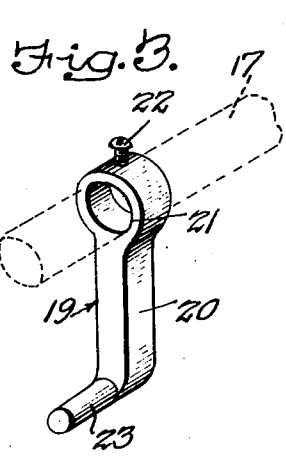
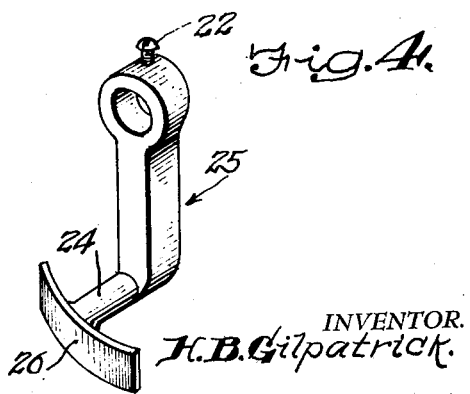
INVENTOR.
H. B. Gilpatrick
BY Victor J. Evans & Co.
ATTORNEYS Patented Feb. 21, 1950

2,498,412

UNITED STATES PATENT OFFICE 2,498,412

LOCK RING SAFETY BAR FOR TIRES

Halbert B. Gilpatrick, Broadbent, Oreg.

Application June 29, 1948, Serial No. 35,815

2 Claims. (Cl. 152—405)

This invention relates to a safety device for vehicle wheels.

Usually, ordinary truck tires have lock rings on the rims which lock the tire in place upon inflation. In many instances, this ring has been known to expand and spring open, when not correctly placed in locking position even though believed to be in locked position, thus causing bodily injury.

An object of the present invention is to provide a safety device to safeguard the personnel and others against possible injury or death in the event of a lock ring springing off a vehicle wheel during handling of the latter.

Another object of the invention is to provide a lock ring safety device which is simple in structure, easy to manipulate, and highly efficient in action.

Other objects and advantages will become apparent from the following description.

Referring to the drawings:

Figure 1 is a top plan view showing a pneumatic tire and wheel having the improved lock ring safety device thereon, Figure 2 is an enlarged sectional view taken on the line 2—2 of Figure 1, Figure 3 is a perspective view of one of the slide hooks, according to the present invention, Figure 4 is a perspective view of a modified type of slide hook.

In the drawings, the numeral 10 designates a wheel including a wheel disc 11 having a circular opening 12 arranged centrally therein and a plurality of spaced apertures 9 arranged about the opening 12. Projecting from the outer peripheral edge of the disc 11 and secured thereto is an annular shoulder 13. Mounted on the wheel 10 is a pneumatic tire 14 and interposed between the tire 14 and the annular shoulder is an annular locking ring 15 for locking the tire 14 in place on the wheel 10.

The locking ring safety device comprises a cylindrical bar 16 and a pair of aligned cylindrical bars 17 and 18 arranged at right angles with respect to the bar 16 and secured thereto intermediate the ends of the latter.

Mounted for longitudinal movement along each of the bars 16, 17, and 18 are slide hooks 19, Figures 1, 2 and 3. Each slide hook 19 embodies an arm 20 provided with a socket 21 on one end thereof for slidably receiving one of the cylindrical bars. Extending through the socket 21 is a screw 22 for engaging the outer surface of the bar in the socket 21 to releasably lock the slide hook 19 in its various adjusted positions along the cylindrical bars. Arranged at right angles with respect to the other end of the arm 20 and secured thereto is a stud bolt 23.

In the embodiment shown in Figure 4, the stud bolt 24 of the slide hook 25 carries an arcuately shaped plate 26 on one end thereof, the slide hook 25 being provided with a socket and screw similar in construction to the aforementioned socket and screw of the slide hook 19.

In use, the lock ring safety device is arranged in side by side relation with respect to the wheel disc 11 with the sliding hooks 19 registering with the opening 12 in the disc 11. The sliding hooks are moved outwardly along the cylindrical bars 16, 17, and 18 so that their arms 20 abut the disc. In the slide hook shown in Figure 3, the stud bolt 23 grips the disc 11 to maintain the locking device in position on the wheel, while in the embodiment of Figure 4, the stud bolt has an arcuately shaped plate 26 providing an additional gripping surface for the slide hook 25 on the wheel disc 11. Thus, it will be seen that the ends of the bars 16, 17, and 18 project or extend beyond the lock ring in case the lock ring 15 springs off the wheel during handling of the wheel.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a vehicle wheel, the combination with a disc provided with an aperture therein, an annular shoulder on said disc, a pneumatic tire on said wheel, and a lock ring interposed between said tire and said shoulder, of a safety device for preventing accidental loss of said lock ring, said device comprising a first bar, a pair of aligned bars arranged at right angles with respect to said first bar and secured thereto, said bars being arranged in side by side relation with respect to said wheel disc and the ends of said bars projecting beyond said lock ring, and slide hooks carried by said bars for maintaining said bars in side by side relation with respect to said disc.

2. In a vehicle wheel, the combination with a disc provided with an aperture therein, an annular shoulder on said disc, a pneumatic tire on said wheel, and a lock ring interposed between said tire and said shoulder, of a safety device for preventing accidental loss of said lock ring, said safety devices comprising a first bar, a pair of aligned bars arranged at right angles with respect to said first bar and secured thereto, said bars being arranged in side by side relation with respect to said wheel disc and the ends of said bars projecting beyond said lock ring, and slide hooks carried by said bars for maintaining said bars in side by side relation with respect to said disc, each of said slide hooks embodying an arm provided with a socket in one end for slidably receiving said bar, screw means extending through said socket for engaging the outer surface of said bar, and a stud bolt secured to the other end of said arm.

HALBERT B. GILPATRICK.

REFERENCES CITED

The following references are of record in the file of this patent:

UNITED STATES PATENTS

| Number | Name | Date |
| --- | --- | --- |
| 1,507,671 | Greene | Sept. 9, 1924 |

FOREIGN PATENTS

| Number | Country | Date |
| --- | --- | --- |
| 102,999 | Austria | of 1926 |